No. 863,110.   
PATENTED AUG. 13, 1907.

H. SMITHSON.
FRUIT AND VEGETABLE CUTTER AND SLICER.
APPLICATION FILED MAR. 29, 1906.

Witnesses:
Richard H. Chapman
Charles E. Christman

Inventor:
Henry Smithson

UNITED STATES PATENT OFFICE.

HENRY SMITHSON, OF ORTONVILLE, MINNESOTA.

FRUIT AND VEGETABLE CUTTER AND SLICER.

No. 863,110.  Specification of Letters Patent.  Patented Aug. 13, 1907.

Application filed March 29, 1906. Serial No. 308,788.

*To all whom it may concern:*

Be it known that I, HENRY SMITHSON, a citizen of the United States, residing at Ortonville, in the county of Big Stone and State of Minnesota, carpenter, have invented certain new and useful Improvements in Fruit and Vegetable Cutters and Slicers, of which the following is a specification, reference being had to the accompanying drawings, forming part thereof.

The object of my invention is to provide an improved machine for cutting and slicing roots, vegetables, fruits, and the like, and the invention consists in the constructions and arrangements of the parts hereinafter fully described and particularly pointed out in the claims.

Figure 1:
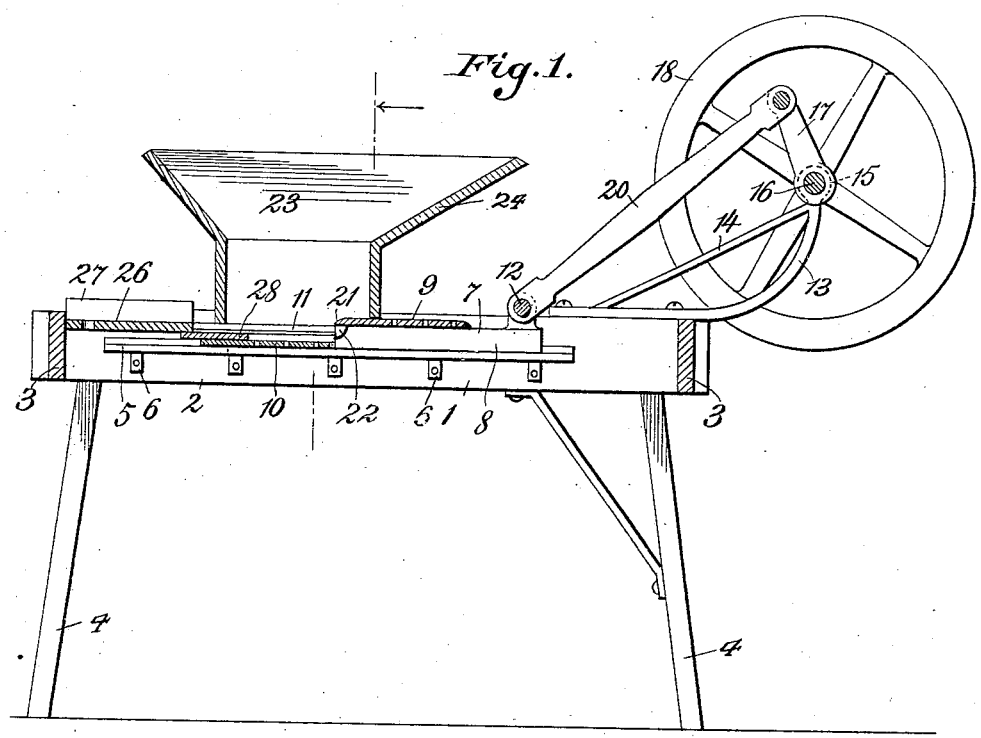
Figure 2:
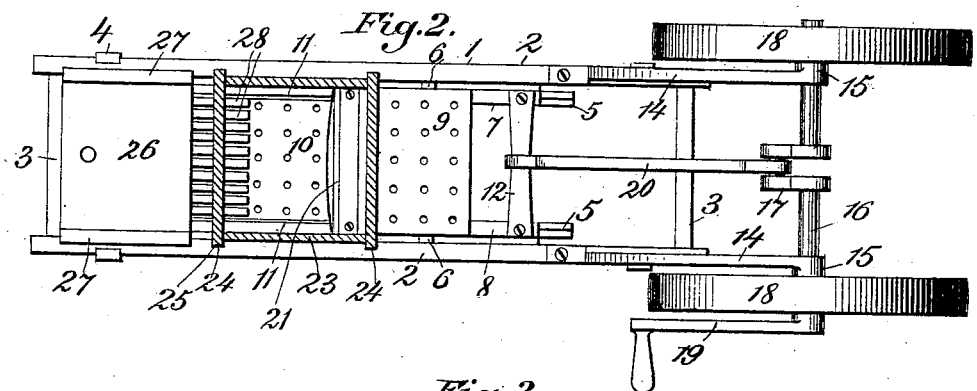

For a full description of the invention and the merits thereof and also to acquire a knowledge of the details of construction of the means for effecting the result, reference is to be had to the following description and accompanying drawings, in which:

Figure 1 is a vertical longitudinal sectional view of a machine embodying the improvements of my invention; Fig. 2 is a top plan view thereof, with parts in section; and, Fig. 3 is a transverse sectional view.

Corresponding and like parts are referred to in the following description and indicated in all the views of the drawings by the same reference characters.

The frame 1 of my improved machine embodies side bars 2 connected together at their ends by cross bars 3, and said frame is preferably supported in an elevated position on legs 4. Two longitudinally extending rails 5 are secured to the inner sides of the side bars 2 and are spaced from said side bars as shown in Fig. 3, said rails being preferably secured to or supported upon brackets 6 attached to the side bars.

Figure 3:
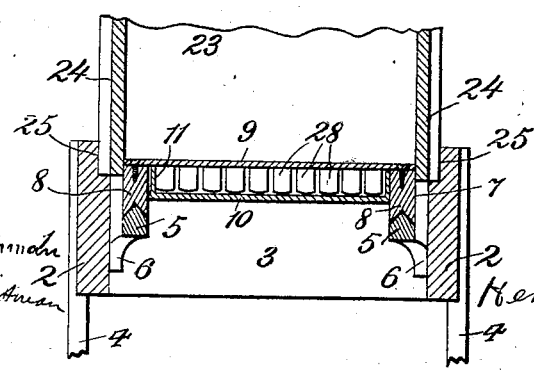

A frame 7 is adapted to reciprocate on the rails 5 and this frame embodies two longitudinally extending side bars 8 preferably grooved, as shown in Fig. 3 and mounted to slide upon the correspondingly shaped upper edges of the rails 5.

A perforated plate 9 is secured to the bars 8 of the reciprocating frame 7 near one end of the latter and said plate extends across from one bar to the other as shown in Fig. 2 and is provided at its rear edge with a cutter blade 21 from which cutters 22 depend, as shown best in Fig. 1. This blade 21 is removably secured to the rear edge of the perforated plate 9 so that it may be detached and replaced by another blade of different shape or possessing different characteristics, whenever desired. Another perforated plate 10 is secured to the side bars 8 of the frame 7 and extends from one side bar to the other at a point on the bars in rear of the plate 9 and at a lower elevation than the said plate 9, the front edge of the perforated plate 10 preferably terminating flush with the rear edge of the plate 9 where the cutters 22 are located, all as best seen in Fig. 1. As shown in Fig. 3, the perforated plate 10 is provided with upwardly extending sides 11 terminating about level with the perforated plate 9 and constituting in effect, with the bottom of the plate 10, a tray.

In order to reciprocate the frame 7, it is provided at its forward end with a cross head 12 to which a pitman 20 is connected at one end, and at its other end the pitman is connected to the wrist pin of a crank 17 on the operating shaft 16. This shaft is journaled in bearings 15 on the outer ends of the curved arms 13 secured to the front end of the framework 1 and preferably braced by the rods 14, as shown. A handle 19 may be provided for turning the shaft 16 to effect the reciprocation of the sliding frame 7.

18 designates fly wheels on the shaft 16. A hopper 23 has its lower or discharge portion 24 seated within recesses 25 on the side bars 2 of the main framework 1, and the discharge opening of said hopper is intended to be registered with the perforated plates 9 and 10, both of which constitute cut-offs for the hoppers. Except for these cut-offs, the hopper 23 is open at its lower or discharge end. At the rear edge of the lower portion 24 of the hopper 23, a transversely extending series of horizontal cleaning fingers 28 is provided, said fingers being slightly spaced from each other, as illustrated in Figs. 2 and 3 and projecting at their forward ends into the hopper. These fingers are guided by a support 26 which is provided with side flanges 27 by which it is maintained in position within the framework 1, the flanges 27 resting directly upon the side bars 2. The fingers 28 are held in a horizontal plane between the two blades of the perforated plates 9 and 10, said latter plate being adapted to slide directly underneath and in contact with the cleaning fingers as best seen in Fig. 1.

In the practical operation of my improved machine for cutting and slicing roots, vegetables, fruits, or the like, the material to be cut or sliced is deposited in the hopper 23 and when the frame is moved forwardly to approximately the position illustrated in Fig. 1, it is evident that the material in the hopper will rest upon the perforated plate 10 below the discharge end of the hopper, said plate constituting the cut-off for the discharge opening when the parts are in this position. As the frame 7 is reciprocated back and forth by turning the shaft 16, the two plates 9 and 10 will be first carried rearwardly and the knives 22 will cut or slice the vegetables, or other material, the rear edge of the hopper coacting with the knives to serve as a stop for the material and a rest against which the knives rest. The material will thus be sliced and dropped in a sliced condition from the framework into any suitable receptacle placed to receive it, while the fingers 28 will effectively clean the cutters 23 which themselves will be kept free from clogging up by the contact of the plate 10, and upon a return of the parts, more material will drop upon the plate 10 for a subsequent operation, the perforated plate 9 moving forwardly away from the discharge hopper and from its cut-off relation thereto, to permit more material to descend into the path of the knives or cutters 22. By providing plates 9 and 10 with perforations as described, all roots that are being cut will be freed from sand and dirt which would otherwise cling thereto.

From the foregoing description in connection with the accompanying drawings, it will be seen that I have provided a very simple and efficient construction of vegetable, fruit or root cutter and slicer which is composed of comparatively few parts that may be cheaply manufactured and easily assembled and in which all the parts coming into contact with the material to be sliced or cut may be readily kept clean.

Having thus described the invention, what is claimed as new is:

A machine of the character described, comprising a hopper provided with a bottom discharge opening, a frame mounted underneath said discharge opening and embodying side bars, a support for the hopper, rails secured within the hopper support on which the side bars of the frame are mounted to slide, means for reciprocating said frame, two cut-off plates, both rigidly secured to the side bars of the said frame, one in a lower plane than the other, and the front edge of the lower plate terminating flush with the rear edge of the upper plate, the rear edge of the upper plate constituting a horizontal cutting edge and being provided with depending cutters, cleaning fingers projecting into the plane of the discharge end of the hopper and located in a plane between the said plates and adapted to project between the depending cutters, the lower plate being adapted to extend underneath and in contact with the said fingers, and a support 26 provided with side flanges 27 by which it is maintained in position within the hopper support, said support 26 carrying the said fingers.

Signed at Ortonville, in the county of Big Stone and State of Minnesota, this first day of February, 1906.

HENRY SMITHSON.

Witnesses:
 CHARLES E. CHRISMAN,
 JOSEPH F. KING.